(12) United States Patent
Kim et al.

(10) Patent No.: US 7,535,472 B2
(45) Date of Patent: May 19, 2009

(54) METHOD FOR GENERATING INTUITIVE QUASI-EIGEN FACES

(75) Inventors: Ig-Jae Kim, Seoul (KR); Hyeong-Seok Ko, Seoul (KR)

(73) Assignee: Seoul National University Industry Foundation, Bongchun-dong, Gwanak-Gu, Seoul (KR)

( * ) Notice: Subject to any disclaimer, the term of this patent is extended or adjusted under 35 U.S.C. 154(b) by 255 days.

(21) Appl. No.: 11/398,987

(22) Filed: Apr. 5, 2006

(65) Prior Publication Data
US 2007/0236501 A1    Oct. 11, 2007

(51) Int. Cl.
G06T 13/00    (2006.01)
(52) U.S. Cl. ...................................................... 345/473
(58) Field of Classification Search ................ None
See application file for complete search history.

(56) References Cited

U.S. PATENT DOCUMENTS

| | | | | |
|---|---|---|---|---|
| 5,844,573 A | * | 12/1998 | Poggio et al. ............... | 345/441 |
| 5,880,788 A | * | 3/1999 | Bregler ....................... | 348/515 |
| 6,188,776 B1 | * | 2/2001 | Covell et al. ................ | 382/100 |

OTHER PUBLICATIONS

Choe, B., Ko, H., Analysis and Synthesis of Facial Expressions with Hand-Generated Muscle Actuation Basis, Nov. 2001, Proceedings of Computer Animation 2001, p. 1-8.*

Chuang, Erika, Bregler, C, Moods Swings: Expressive Speech Animation, Apr. 2005, ACM Transactions on Graphics, vol. 24, No. 2, pp. 331-347.*

Yin, B., Shi, Q., Wang, C., Sun, Y., Improved Adaptive Principal Component Extraction Algorithm Based on Face Recognition with Morphable Model, 2005, Journal of Computational Information Systems, pp. 329-336.*

Matthew Brand, Voice Puppetry, Proceedings of SIGGRAPH, 1999, 21-28, ACM Press, USA.

Christoph Bregler, et al., Video Rewrite: Driving Visual Speech with Audio, Proceedings of SIGGRAPH, 1997, 353-360, ACM Press, USA.

Cao, et al., Real-time Speech Motion Synthesis from Recorded Motions, Proceedings of ACM SIGGRAPH, 2004, 347-355, Eurographics/ACM SIGGRAPH Symposium on Comp. Animation, USA.

(Continued)

*Primary Examiner*—Xiao M Wu
*Assistant Examiner*—Said Broome
(74) *Attorney, Agent, or Firm*—John K. Park; Park Law Firm

(57) ABSTRACT

In blendshape-based facial animation, two main approaches are used to create the key expressions: manual sculpting and statistically-based techniques. Hand-generated expressions have the advantage of being intuitively recognizable, thus allowing animators to use conventional keyframe control. However, they may cover only a fraction of the expression space, resulting in large reproduction animation errors. On the other hand, statistically-based techniques produce eigenfaces that give minimal reproduction errors but are visually non-intuitive. In the invention the applicants propose a technique to convert a given set of hand-generated key expressions into another set of so-called quasi-eigen faces. The resulting expressions resemble the original hand-generated expressions, but have expression space coverages more like those of statistically generated expression bases. The effectiveness of the proposed technique is demonstrated by applying it to hand-generated expressions.

18 Claims, 10 Drawing Sheets

OTHER PUBLICATIONS

Byoungwon Choe, et al., Analysis and Synthesis of Facial Expressions with Hand-Generated Muscle Actuation Basis, In Proceedings of Computer Animation, Nov. 2001, 12-19, USA.

Byoungwon Choe, et al., Performance-driven Muscle-based Facial Animation, The Journal of Visualization and Computer Animation, 2001, 67-79, 12, John Wiley & Sons, Ltd., USA.

Erika Chuang, et al., Performance Driven Facial Animation Using Blendshape Interpolation, Stanford University Computer Science Technical Report, 2002, USA.

Zhigang Deng, et al., Synthesizing Speech Animat. by Learning Compact Speech Co-articulation Mod., Proceed. of Comput. Graphics Inter., Jun. 2005, 19-25, IEEE, Long Island, NY.

Irfan A. Essa, Coding, Analysis, Interpretation, and Recognition of Facial Expressions, Georgia Institute of Tech. Technical Report, Aug. 1998, 757-763, 19(7), IEEE, USA.

Yao-Jen Chang, et al., Transferable Videorealistic Speech Animation, Eurographics/ACM SIGGRAPH Symposium on Computer Animation, 2005, 143-151, The Eurographics Assoc., U.K.

Tony Ezzat, et al., Trainable Videorealistic Speech Animation, Proceedings of SIGGRAPH, 2002, 388-398, ACM Press, San Antonio, TX.

Pushkar Joshi, et al., Learning Controls for Blend Shape Based Realistic Facial Animation, Eurographics/SIGGRAPH Symposium on Comp. Animation, 2003, Eurographics Assoc., U.K.

Kolja Kahler, et al., Geometry-based Muscle Modeling for Facial Animation, Proceedings of Graphics Interface, 2001, 37-46, Germany.

Cyriaque Kouadio, et al., Real-time Facial Animation Based upon a Bank of 3D Facial Expressions, Proceedings of Computer Animation, 1998, IEEE Computer Society Press, USA.

Na, et al., Hierarchical Retargetting of Fine Facial Motions, Proceedings of Eurographics, 2004, 23 (3), Eurographics Association and Blackwell Publishing, UK & Malden, MA.

Jun-Yong Noh, et al., Expression Cloning, Proceedings of SIGGRAPH 2001, 277-288, ACM Press, USA.

Frederic Pighin, et al., Synthesizing Realistic Facial Expressions from Photographs, Proceedings of SIGGRAPH, 1998, 75-84, ACM Press, USA.

Frederic Pighin, et al., Resynthesizing Facial Animation through 3D Model-based Tracking, Proceedings of International Conference on Computer Vision, 1999, 143-150, USA.

Hyewon Pyun, et al., An Example-based Approach for Facial Expression Cloning, Proceedings of Eurographics/ACM SIGGRAPH, 2003, 167-176, The Eurographics Association, USA.

Eftychios Sifakis, et al., Automatic Determination of Facial Muscle Activations from Sparse Motion Capture Marker Data, Proceedings of SIGGRAPH, 2005, 417-425, ACM Press, USA.

Li Zhang, et al., Spacetime Faces: High Resolution Capture for Modeling and Animation, Proceedings of SIGGRAPH, 2004, 548-558, ACM Inc., New York, NY.

Terzopoulos, et al., Physically-based Facial Modeling, Analysis, and Animation, Journal of Visualization and Comp. Animation, 1990, 73-80, 1-2, John Wiley & Sons, Inc., USA.

Daniel Vlasic, et al., Face Transfer and Multilinear Models, Proceedings of SIGGRAPH, 2005, 426-433, ACM Press, USA.

Wang, et al., High Res. Acquisition, Learning and Transfer of Dynamic 3-D Fac. Expressions, Eurographics, 2004, 677-686, 23-3, Euro. Assoc. and Blackwell Publishing, UK & USA.

Keith Waters, A Muscle Model for Animating Three-dimensional Facial Expression, Computer Graphics, Jul. 1987, 17-24, 21-4, ACM, USA.

Lance Williams, Performance-driven Facial Animation, Computer Graphics, Aug. 1990, 235-242, 24-4, ACM, USA.

\* cited by examiner

Hand-Generated Basis    Quasi-Eigen Faces

Zygomaticus major

Orbicularis ons

Masseter, relaxed Temporalis and Internal Pterygoid

L-Risorius

METHOD FOR GENERATING INTUITIVE QUASI-EIGEN FACES

BACKGROUND OF THE INVENTION

The present invention relates to a method for generating intuitive quasi-eigen faces.

1. Introduction

The facial expressions of animated characters play a central role in delivering the story. For an animation studio, therefore, the ability to generate expressive and plausible facial expressions is a critical skill. Nevertheless, as yet no standard procedure for generating facial expressions has been established; when facial animations are required, a whole gamut of approaches are mobilized, ranging from labor-intensive production work to state-of-the-art technical supports. The invention proposes a small but very useful innovation in the area of 3D facial animation, which can be adopted in a wide range of facial animation productions.

Probably, the most popular approach currently used in facial animation productions is the so-called blendshape technique, which synthesizes expressions by taking a linear combination of a set of pre-modeled expressions. The applicants call this expression set the expression basis. Many commercial animation packages such as Maya and Softimage support blendshape-based facial animation. The technique the applicants develop in the present invention is for systems of this type.

A fundamental question in developing a blendshape-based facial animation system is how to control the expressions. One approach is to let the animators manually control the weights assigned to each member of the expression basis set in order to produce the desired expression sequences. Another popular approach that can be taken provided facial motion capture is available, is to set up the system so that the facial animation is driven by a human performance.

In this approach, if the basis is taken from the human subject, in principle the original performance can be reproduced. Although such reproduction may not be needed in an animation production, it has theoretical significance to developers because it can utilized as a benchmark of a blendshape technique: if a method can accurately reproduce the original performance, it can produce other facial animations accurately. The present work assumes that the facial animation system is operated by performance-driven control, but also assumes that manual control can be added whenever the results need to be edited.

Another fundamental issue that must be resolved when developing a blendshape technique is how to form the expression basis. The present work is related to this issue. A casual approach practiced by many animation studios is to use an expression basis comprised of manually modeled, intuitively recognizable key expressions. The basis should contain sufficient elements span the desired range of expressions. The term "basis" is usually reserved for an independent set of elements that spans the entire expressions. In the disclosure of the present application, however, the applicants use the term to loosely mean a set of expressions from which linear combinations are taken. An advantage of using a hand-generated basis is that the combinations of basis elements produce somewhat predictable results. A disadvantage of this approach is that the linear combinations may cover only a portion of full range of facial expressions. When the system is used to reproduce a human performance, the lack of coverage manifests as reproduction errors.

In the context of blendshape-based reproduction of human performances, another well-established approach to obtain the expression basis is to use principal component analysis (PCA). In this method, a set of mutually-orthogonal principal components that spans the expression space is generated by statistical analysis of performance data. Because this technique gives quantitative information on the coverage of each component, by selecting the dominant components the applicants can form an expression basis whose coverage is predictable and greater than that of manually generated bases, resulting in more accurate reproduction of the original performance. A drawback of this approach is that the expressions corresponding to the principal components are visually non-intuitive. Hence animators cannot predict the expression that will be produced by a particular linear combination.

Here the applicants propose a new approach to basis generation that gives coverages comparable to those of statistically generated bases while at the same time having basis elements with meaningful shapes. This approach is based on our observation that a hand-generated expression can be modified such that the resulting expression remains visually close to the original one but its coverage over the expression space increases. It is also based on the relaxation the applicants take that the basis elements do not need to be strictly orthogonal to each other; they can still span the expression space.

2. Related Work

A large number of techniques for synthesizing human expressions have been proposed since the pioneering work of [Parke 1972]. Facial expression can be viewed as resulting from the coordination of (mechanical) components such as the jaw, muscles, and skin.

Various researchers have explored physically based techniques for synthesizing facial expressions[Waters 1987; Terzopoulos and Waters 1990; Terzopoulos and Waters 1993; Lee et al. 1995; Wu et al. 1995; Essa and Pentland 1997; Kahler et al. 2001; Choe et al. 2001; Sifakis et al. 2005]. The present work takes a different approach: expressions are synthesized by taking linear combinations of several key expressions. Thus, instead of looking into the physics of facial components, the applicants utilize facial capture data to obtain realistic results. In this section, the applicants review previous work, with a focus on blendshape techniques and performance-driven facial animation techniques.

The blendshape technique has been widely used for expression synthesis. To generate human expressions in real-time, [Kouadio et al. 1998] used linear combinations of a set of key expressions, where the weight assigned to each expression was determined from live capture data. [Pighin et al. 1998] created a set of photorealistic textured 3D expressions from photographs of a human subject, and used the blendshape technique to create smooth transitions between those expressions. [Blanz and Vetter 1999] introduced a morphable model that could generate a 3D face from a 2D photograph by taking a linear combination of faces in a 3D example database. To increase the covering range of the key expressions, [Choe and Ko 2001] let animators sculpt expressions corresponding to the isolated actuation of individual muscles and then synthesized new expressions by taking linear combinations of them.

A critical determinant of the quality of the expression generated by blendshape-based synthesis is the covering range of the key expressions being used. [Chuang 2002] used a PCA-based procedure to identify a set of key expressions that guarantees a certain coverage. However, the resulting principal components did not correspond intuitively meaningful human expressions. [Chao et al. 2003] proposed another basis generation technique based on independent component analysis. In the key expression set produced using this approach, the differences among the elements were more recognizable than those generated by [Chuang 2002]; however, the individual elements in the set still did not accurately represent familiar/vivid human expressions. As a result, conventional keyframe control is not easy using this approach. To enable separate modifications of specific parts of the face in a blendshape-based system, [Joshi et al. 2003] proposed automatic segmentation of each key expression into meaningful blend regions.

[Williams 1990] introduced a performance-driven approach to synthesize human expressions. This approach utilizes the human ability to make faces and has been shown to be quite effective for controlling high-DOF facial movements. The uses of this approach for blendshape-based reproduction of facial performances were introduced above. [Noh and Neumann 2001; Pyun et al. 2003; Na and Jung 2004; Wang et al. 2004] proposed techniques to retarget performance data to synthesize the expressions of other characters. Recently, [Vlasic et al. 2005] developed a multilinear model that can transfer expressions/speech of one face to other faces.

Another class of performance-driven facial animation techniques is the speech-driven techniques. [Bregler et al. 1997; Brand1999; Ezzat et al. 2002; Chao et al. 2004; Chang and Ezzat. 2005; Deng et al. 2005] are several representative works exploring this research direction.

Accordingly, a need for the method for generating intuitive quasi-eigen faces has been present for a long time. This invention is directed to solve these problems and satisfy the long-felt need.

SUMMARY OF THE INVENTION

The present invention contrives to solve the disadvantages of the prior art.

An object of the invention is to provide a method for generating intuitive quasi-eigen faces to form the expression basis for blendshape-based facial animation systems.

Another object of the invention is to provide a method for generating intuitive quasi-eigen faces, which the resulting expressions resemble the given expressions.

Still another object of the invention is to provide a method for generating intuitive quasi-eigen faces, which has significantly reduced reconstruction errors than hand-generated bases.

3. Problem Description

Let $v=v(t)=[v_1^T, \ldots, v_N^T]^T$ represent the dynamic shape of the 3D face model at time t, wherein T in superscript represents a transpose of a vector. It is a triangular mesh consisting of N vertices, where vi represents the 3D position of the i-th vertex. The applicants assume that the geometry $v^0=[(v_1^0)^T, \ldots, (v_N^0)^T]^T$ of the neutral face is given. The applicants also assume that motion capture data are given in a 3N×L matrix $\Xi=[v(1), \ldots, v(L)]$, where L is the duration of the motion capture in number of frames. The applicants are interested in finding a set of facial expressions, linear combinations of which span $\Xi$.

Let $\hat{E}^H=\{\hat{e}_1^H, \ldots, \hat{e}_N^H\}$ be the hand-generated expression basis that is given by the animator. Here, n is the number of elements and $\hat{e}_i^H$ is the geometry of the i-th element. Let $e_i^H$ represent the displacement of $\hat{e}_i^H$ from the neutral face, i.e., $\hat{e}_i^H = e_i^H - v^0$. In the invention, the applicants call the set of displacements such as $E^H=\{e_1^H, \ldots, e_N^H\}$ also the (hand-generated) expression basis if it does not cause any confusion. When the weights $w_i^H$ are given, the applicants synthesize the expression v by $$v = v^0 + \sum_{i=1}^{n} w_i^H e_i^H \tag{1}$$

A potential problem of the hand-generated expression basis $E^H$ is that linear combinations of the basis elements may not span $\Xi$. The goal of the invention is to develop a procedure to convert $E^H$ into another basis $E^{QE}=\{e_1^{QE}, \ldots, e_N^{QE}\}$, such that the new basis spans $\Xi$ and each element $e_i^{QE}$ visually resembles the corresponding element $e_i^H$ in $E^H$. The applicants call the elements in the new basis quasi-eigen faces.

According to the present invention, a method for generating intuitive quasi-eigen faces includes steps of: a) representing a dynamic shape of a three dimensional face model with a vector; b) making a hand-generated expression basis; c) converting the hand-generated expression basis into a new expression basis, wherein the new expression basis is a quasi-eigen faces; and d) synthesizing expression with the quasi-eigen faces.

The new expression basis includes a plurality of quasi-eigen faces, wherein the linear combinations of the quasi-eigen faces cover a motion capture data, wherein each of the quasi-eigen faces resembles a corresponding element of the hand-generated expression basis.

The dynamic shape of a three dimensional face model is represented by a vector, $v=v(t)=[v_1^T, \ldots, v_N^T]^T$, where $v_i$ represents the 3D position of the i-th vertex, N is a number of vertices.

The vector v is represented by a triangular mesh including N vertices, and the vector forms a facial mesh data.

The expression v is synthesized by $$v = v^0 + \sum_{i=1}^{n} w_i^H e_i^H,$$

where the neutral face, $v^0=[(v_1^0)^T, \ldots, (v_N^0)^T]^T$, and the weights, $w_i^H$, are given. The hand-generated expression basis is represented by $\hat{E}^H=\{\hat{e}_1^H, \ldots, \hat{e}_n^H\}$, where n is the number of elements of the hand-generated expression basis and $\hat{e}_i^H$ is the geometry of the i-th element.

The method set of displacement is represented by $$E^H=\{e_1^H, \ldots, e_N^H\},$$

where $e_i^H$ represents the displacement of $\hat{e}_i^H$ from the neutral face, $e_i^H=\hat{e}_i^H-v^0$.

The step of converting the hand-generated expression basis into a new expression basis includes steps of: a) forming an approximate hyperplane out of the motion capture data or the facial mesh data; and b) identifying the orthogonal axes that spans the hyperplane.

The step of identifying the orthogonal axes that spans a hyperplane includes a step of using a principal component analysis (PCA).

The motion capture data are given in given in a 3N×L matrix $\Xi=[v(1), \ldots, v(L)]$, where N is the number of vertices of mesh representing the motion capture data, where L is the duration of the motion capture in number of frames.

The hyperplane is formed by the cloud of points plotted Ξ regarding each of the expressions in the 3N-dimensional space.

The step of identifying the orthogonal axes that spans the hyperplane includes steps of: a) taking the mean of v, $\mu = [\mu_1^T, \ldots, \mu_N^T]^T$, where the summation is taken over the entire motion capture data Ξ; b) obtaining a centered point cloud, $\tilde{D} = [\tilde{v}(1)^T, \ldots, \tilde{v}(L)^T]^T$, where $\tilde{v}(i) = v(i) - \mu$; and c) constructing the covariance matrix C using $$C = \frac{1}{L}\tilde{D}\tilde{D}^T.$$

The C is a symmetric positive-definite matrix with positive eigenvalues $\lambda_1, \ldots, \lambda_{3N}$ in order of magnitude, with $\lambda_1$ being the largest.

The method may further include a step of obtaining the eigen faces from m eigenvectors $E_{PCA} = \{e_1^{PCA}, \ldots, e_m^{PCA}\}$ corresponding to $\{\lambda_1, \ldots, \lambda_m\}$ the principal axes.

The coverage of the principal axes is given by $$\sum_{i=1}^{m} \lambda_i \Big/ \sum_{i=1}^{3N} \lambda_i.$$

The method may further include a step of converting the hand-generated expression basis into the quasi-eigen basis, the set of quasi-eigen faces, with the eigenfaces ready.

The step of converting the hand-generated expression basis into the quasi-eigen basis includes steps of: a) computing $$w_{ij}^{PCA\text{-}to\text{-}QE} = e_j^{PCA} \cdot (e_i^H - \mu),$$

where i ranges over all the hand-generated elements, and j ranges over all the principal axes; and b) obtaining the quasi-eigen faces by $$e_i^{QE} = \mu + \sum_{j=1}^{m} w_{ij}^{PCA-to-QE} e_j^{PCA}.$$

The method may further include a step of synthesizing a general expression by the linear combination $$\sum_{i=1}^{n} w_i^{QE} e_j^{PCA}.$$

The weights $w_i^{QE}$ takes on both positive and negative values when the eigenfaces are used.

The method may further include a step of taking $\hat{e}_i^H$ to represent the full actuation of a single expression muscle with other muscles left relaxed for intrinsically ruling out the possibility of two hand-generated elements having almost identical shapes.

The method may further include steps of: a) looking at the matrix $W^{PCA\text{-}to\text{-}QE} = (w_{ij}^{PCA\text{-}to\text{-}QE})$; b) determining if $e_j^{PCA}$ is missing in the quasi-eigen basis by testing if $$\sum_{i=1}^{n} |w_{ij}^{PCA\text{-}to\text{-}QE}|$$

is less than a threshold ε; c) augmenting the basis with $e_j^{PCA}$; d) notifying the animator regarding the missing eigenface $e_j^{PCA}$.

The method may further include a step of retargeting the facial expressions by feeding a predetermined expression weight vector to a deformation bases.

The predetermined expression weight vector is obtained by minimizing $$|v^* - v|^2 = \sum_{j=1}^{N} \left| d_j^* - \sum_{i=1}^{n} w_i^{QE} e_{ij}^{QE} \right|^2,$$

where $d_j^*$ and $e_{ij}^{QE}$ are the displacements of the j-th vertex of $v^*$ and $e_i^{QE}$, respectively, from $v^0$.

The advantages of the present invention are: (1) the method provides a method for generating intuitive quasi-eigen faces to form the expression basis for blendshape-based facial animation systems; (2) the resulting expressions resemble the given expressions; and (3) the method makes it possible to significantly reduce reconstruction errors than hand-generated bases.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

4. Obtaining Quasi-Eigen Faces

If the facial vertices $v_1, \ldots, v_N$ are allowed to freely move in 3D space, then v will form a 3N-dimensional vector space.

Let us call this space the mathematical expression space E. However, normal human expressions involve a narrower range of deformation. If the applicants plot each expression in $\Xi$ as a point in 3N-dimensional space, the point cloud forms an approximate hyperplane. The PCA is designed to identify the orthogonal axes that span the hyperplane.

Figure 1:
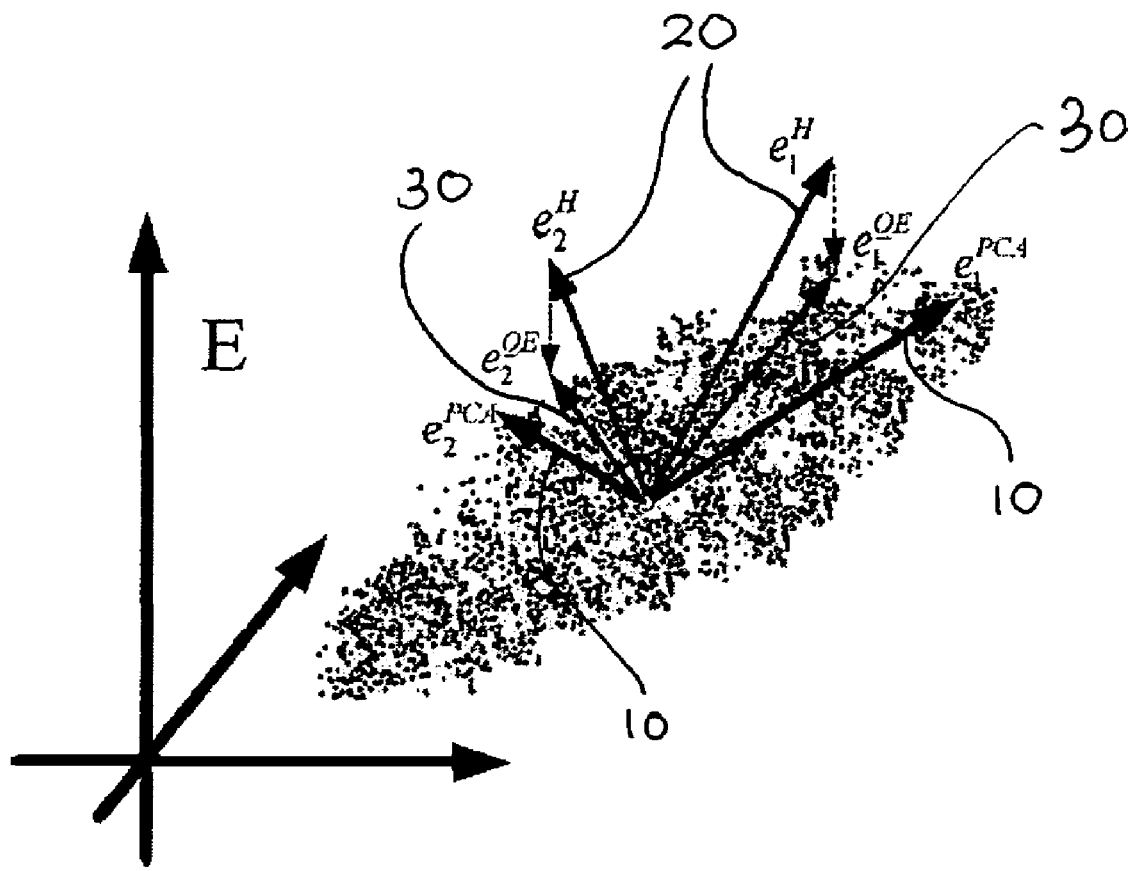
FIG. 1 shows an analogical drawing of the motion capture data and the bases.

The analogical situation is shown in FIG. 1. The 3D coordinate system can be viewed as E, the dots as forming the $\Xi$-hyperplane, and the solid perpendicular axes as the principal components. The arrows 10 stand for PCA basis, the arrows 20 hand-generated basis, and the arrows 30 quasi-eigen basis.

The procedure for obtaining the quasi-eigen faces is based on the principal components. Finding the principal components requires the point cloud to be centered at the origin. Let $\mu=[\mu_1^T, \ldots, \mu_N^T]^T$ be the mean of v where the summation is taken over the entire motion capture data $\Xi$. Then, the applicants can obtain a centered point cloud, $\tilde{D}=[\tilde{v}(1)^T, \ldots, \tilde{v}(L)^T]^T$, where $\tilde{v}(i)=v(i)-\mu$. Now the applicants construct the covariance matrix C using $$C = \frac{1}{L}\tilde{D}\tilde{D}^T \quad (2)$$

C is a symmetric positive-definite matrix, and hence has positive eigenvalues. Let $\lambda_1, \ldots, \lambda_{3N}$ be the eigenvalues of C in order of magnitude, with $\lambda_1$ being the largest. The m eigenvectors $E^{PCA}=\{e_1^{PCA}, \ldots, e_m^{PCA}\}$ corresponding to $\{\lambda_1, \ldots, \lambda_m\}$ are the principal axes the applicants are looking for, the coverage of which is given by $$\sum_{i=1}^{m}\lambda_i / \sum_{i=1}^{3N}\lambda_i.$$

The facial expressions in $E^{PCA}$ are called the eigenfaces. Since the coverage is usually very close to unity even for small m (e.g., in the case of the motion capture data used in this disclosure, m=18 covers 99.5% of $\Xi$), the above procedure provides a powerful means of generating an expression basis that covers a given set $\Xi$ of expressions. A problem of this approach is that, even though the eigenfaces have mathematical significance, they do not represent recognizable human expressions.

In the context of generating the eigenfaces, the applicants can now describe the method to convert the hand-generated expression basis into the quasi-eigen basis (i.e., the set of quasi-eigen faces). This method is based on our observation that the hand-generated elements may lie out of the hyperplane. In the analogical situation drawn in FIG. 1, let's consider two hand-generated expressions (two 3D vectors in the figure) that do not lie on the hyperplane. Although any linear combination of the two expressions should be allowed in principle, if the applicants stipulate that the result must lie on the hyperplane to form a valid expression, then the ratio between the weights assigned to the two expressions must be fixed. This means that, the two expressions, rather than spanning a two dimensional range of expressions, in fact only cover a one dimensional range, resulting in significant coverage loss. Linear combinations that are formed disregarding this constraint will be positioned out of the hyperplane, which explains why reproduction of an original performance generated using a hand-generated bases usually contain large errors.

A simple fix to the above problem would be to project the handgenerated elements onto the hyperplane; the quasi-eigen faces the applicants are looking for in this disclosure are, in fact, the projections of the hand-generated basis elements. To find the projection of a handgenerated element onto each principal axis, the applicants first compute $$w_{ij}^{PCA\text{-}to\text{-}QE}=e_j^{PCA}\cdot(e_i^H-\mu), \quad (3)$$

where i ranges over all the hand-generated elements, and j ranges over all the principal axes. Now, the applicants can obtain the quasi-eigen faces by $$e_i^{QE} = \mu + \sum_{j=1}^{m} w_{ij}^{PCA-to-QE} e_j^{PCA}. \quad (4)$$

With the quasi-eigen basis, a general expression is synthesized by the linear combination $$\sum_{i=1}^{n} w_i^{QE} e_j^{PCA}.$$

applicants would note that in most blendshape-based facial animation systems, the weights are always positive and, in some cases, are further constrained to lie within the range [0;1] in order to prevent extrapolations. When the eigenfaces are used, however, the weights $w_i^{QE}$ is supposed to take on both positive and negative values. The weights of the quasi-eigen basis should be treated like the eigenfaces: even though they are not orthogonal, their ingredients are from an orthogonal basis. Allowing negative weights obviously increases the accuracy of the reproduction of a performance. Although keyframe-animators would not be familiar with negative weights, allowing weights to take on negative values can significantly extend the range of allowed expressions.

The projection steps of Equations 3 and 4 will modify to the hand-generated elements. The applicants need to assess whether the new expressions are visually close to the original ones. If a hand-generated expression lies on the hyperplane (or, is contained in the motion capture data), then it will not be modified by the projection process. When a hand-generated expression is out of the hyperplane, however, the projection will introduce a minimal Euclidean modification to it. Although the scale for visual differences is not the same as that of Euclidean distance, small Euclidean distances usually correspond to small visual changes.

Another aspect that must be checked is the coverage of $E^{QE}$. In the analogical case shown in FIG. 1, when there are two 3D vectors that do not coincide, it is highly likely that the projections of those vectors span the hyperplane. Similarly, if the number of hand-generated expressions is equal to or larger than m, it is highly probable that the projections of those expression will cover the hyperplane z. Blow the applicants introduce several measures that can help avoid potential (but very rare) degenerate cases.

Preventive Treatments: The applicants can guide the sculpting work of the animator so as to avoid overlap among the hand-generated expressions. For example, the applicants can take $\hat{e}_i^H$ to represent the full actuation of a single expression muscle with other muscles left relaxed, which intrinsically rules out the possibility of two hand-generated elements having almost identical shapes [Choe and Ko 2001]. For this purpose, animators can refer to reference book showing drawings of the expressions corresponding to isolated actuation of individual muscles [Faigin 1990]. The facial action coding system [Ekman and Friesen 1978] can also be of great assistance constructing non-overlapping hand-generated expression bases.

Post-Treatments: In spite of the above preventive treatments, the quasi-eigen basis may leave out a PCA-axis. Situations of this type can be identified by looking at the matrix $W^{PCA-to-QE} = (w_{ij}^{PCA-to-QE})$. If $$\sum_{i=1}^{n} |w_{ij}^{PCA-to-QE}|$$

is less than a threshold $\epsilon$, the applicants conclude that $e_j^{PCA}$ is missing in the quasi-eigen basis. In such a case, the applicants can simply augment the basis with $e_j^{PCA}$, or, can explicitly notify the animator regarding the missing eigenface $e_j^{PCA}$ and let him/her make (minimal) modification to it so that its projection can be added to the keyframing basis as well as the quasi-eigen basis.

5. Experiments

To test the proposed method, the applicants obtained a set of facial capture data, and modeled a hand-generated expression basis, based on the actuation of the expression muscles. The applicants followed the procedure described in the previous section and produced the quasi-eigen basis from the hand-generated expression basis.

5.1 Capturing the Facial Model and Performance

The applicants captured the performance of an actress using a Vicon optical system. Eight cameras tracked 66 markers attached to her face, and an additional 7 markers that were attached to her head to track the gross motion, at a rate of 120 frames per second. The total duration of the motion capture was L=35,000 frames. The applicants constructed the 3D facial model using a Cyberware 3D scanner. The applicants established the correspondence between the 3D marker positions and the geometrical model of the face using the technique that was introduced by Pighin et al. [1998].

5.2 Preparing the Training Data

The motion capture data is a sequence of facial geometries. The applicants convert the marker positions of each frame obtained into a facial mesh. For this, the applicants apply an interpolation technique that is based on the radial basis function. The technique gives the 3D displacements of the vertices that should be applied to the neutral face.

5.3 Preparing the Hand-Generated Expression Basis

The applicants performed PCA on the data obtained in Section 5.2. Covering 99.5% of X corresponded to taking the first m=18 principal components. The applicants asked animators to sculpt a hand-generated expression basis $\hat{E}^H = \{\hat{e}_1^H, \ldots, \hat{e}_N^H\}$ consisting of n=18 elements.

If the elements are clustered in E, then their projections will also be clustered in the hyperplane; this will result in poor coverage, requiring the hand-generation of additional basis elements. To reduce the hand-work of the animators, the applicants guided the sculpting work by considering the size and location of the expression muscles, so that each basis element corresponds to the facial shape when a single expression muscle is fully actuated and all other muscles relaxed.

In our experiment, the applicants made 18 hand-generated expressions. Six elements are for the actuation of muscles in the upper region, 12 are for muscles in the lower region.

5.4 Obtaining the Quasi-Eigen Faces

Figure 2:
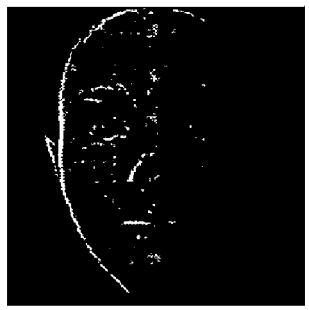
FIG. 2 shows a side-by-side comparison of the hand-generated basis and the quasi-eigen basis in four selected elements.
Figure 2:
Figure 2:
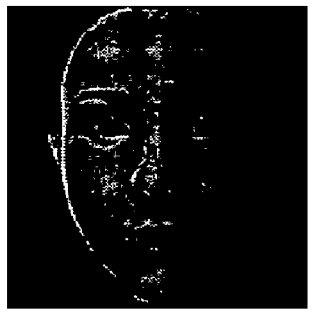
Figure 2:
Figure 2:
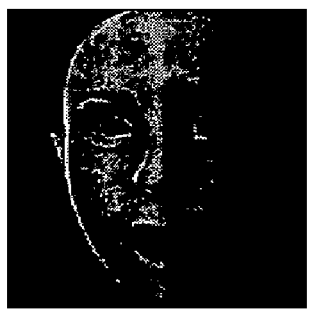
Figure 2:
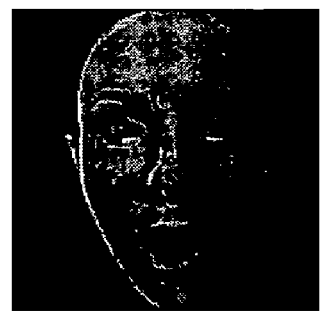
Figure 2:
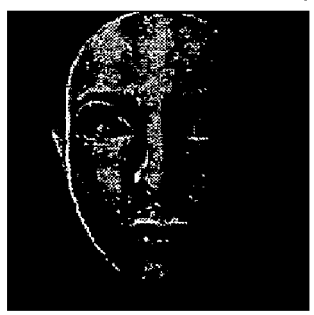
Figure 2:
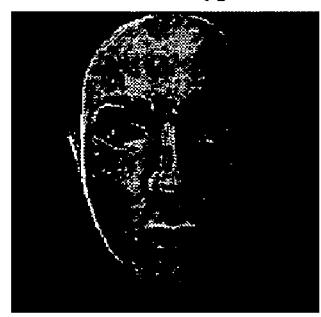

Starting from the given hand-generated basis, the applicants followed the steps described in Section 4 to obtain the quasi-eigen faces. A selection of the quasi-eigen expressions are shown in FIG. 2 along with the corresponding hand-generated expressions. Comparison of the quasi-eigen and hand-generated expressions verifies that although projecting a hand-generated expression onto the hyperplane may involve non-negligible geometry modifications, the original visual impression is preserved.

Running the preprocessin steps, which included the PCA on 6,000 frames of training data, took 158 minutes on a PC with an Intel Pentium 4 3.2 GHz CPU and Nvidia geforce 6800 CPU. After the training was complete, the applicants could create quasi-eigen faces in realtime.

5.5 Analysis

Now, the applicants approximate each frame of □□with a linear combination of the quasi-eigen faces. Let $$v = v^0 + \sum_{i=1}^{n} w_i^{QE} e_i^{QE}$$

be the reconstruction of a frame, and let $v^* = v^0 + d^*\_$ be the original expression of $\Xi$, where $d^*$ is the 3N-dimensional displacement vector from the neutral expression. The applicants find the n-dimensional weight vector $w^{QE} = (w_1^{QE}, \ldots, w_n^{QE})$ by minimizing $$|v^* - v|^2 = \sum_{j=1}^{N} \left| d_j^* - \sum_{i=1}^{n} w_i^{QE} e_{ij}^{QE} \right|^2 \quad (5)$$

where $d_j^*$ and $e_{ij}^{QE}$ are the displacements of the j-th vertex of $v^*$ and $e_i^{QE}$, respectively, from $v^0$. The applicants solve equation 5 using the quadratic programming, which required about 0.007 second per frame. To evaluate the accuracy of the reproduction, the applicants used the following error metric:

$$\alpha[\%] = 100 \times \frac{\sqrt{\sum_{j=1}^{N} |v_j^* - v_j|^2}}{\sqrt{\sum_{j=1}^{N} |v_j^*|^2}} \quad (6)$$

For comparison, the above analysis was also performed using the bases $E^H$ and $E^{PCA}$. The $\alpha$ values obtained using the three bases were $\alpha^{QE} = 0.72\%$, $\alpha^H = 5.2\%$, and $\alpha^{PCA} = 0.62\%$. The results thus indicate that, in terms of coverage, $E^{QE}$ is slightly inferior to $E^{PCA}$ and far better than $E^H$.

Figure 3:
FIG. 3 shows a reconstruction of the original performance.

Qualitative comparison of the reconstructions can be made in the accompanying video. FIG. 3 shows still images extracted from the video. The three images in the left column are taken from the original motion capture. The middle and right columns show the reconstruction of those frames with $E^H$ and $E^{QE}$, respectively.

Figure 4:
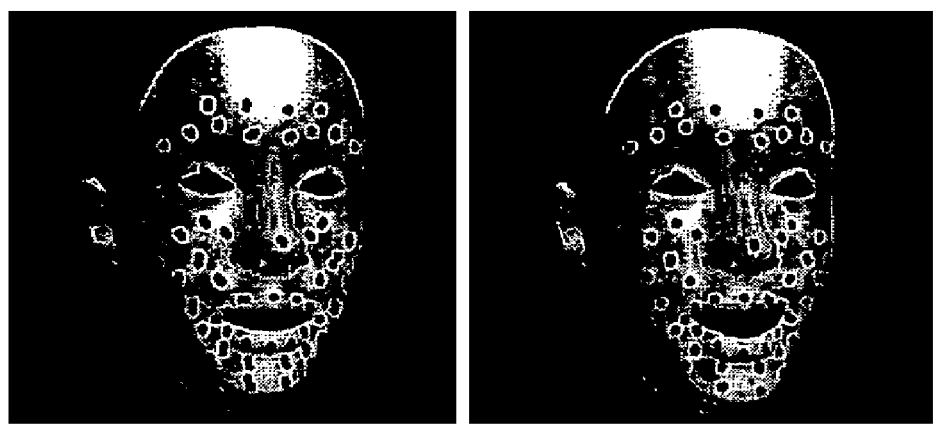
FIG. 4 shows a comparison of the reconstruction errors.

FIG. 4 visualizes the errors introduced during the reconstruction (left: for $E^H$, right: for $E^{QE}$), for the frame shown on the top of FIG. 3. The dots represent the captured marker positions and their positions in the reconstructed result. The applicants can clearly see that reconstruction with the quasi-eigen faces (shown on the right) makes a less amount of error than the reconstruction with the handgenerated basis (shown on the left). To verify the reconstruction quality in more dynamic facial movements, the applicants also experimented the reconstruction of a speech. The video shows that the reconstructed speech with $E^{QE}$ is more realistic than that with $E^H$.

6. Conclusion

In the present invention, the applicants have presented a new method for generating expression bases for blendshape-based facial animation systems. Animation studios commonly generate such bases by manually modeling a set of key expressions. However, hand-generated expressions may contain components that are not part of human expressions, and reconstruction/animation by taking linear combinations of these expressions may produce reconstruction errors or unrealistic results. On the other hand, statistically-based techniques can produce high-fidelity expression bases, but the basis elements are not intuitively recognizable. Here the applicants have proposed a method for generating so-called quasi-eigen faces, which have intuitively recognizable shapes but significantly reduced reconstruction errors compared to hand-generated bases.

In the present invention the applicants have focused on the reproduction of captured performances. This approach was taken based on our experience in facial animation that, in most cases, technically critical problems reside in the analysis part rather than in the synthesis part. If the analysis is performed accurately, then expression synthesis, whether it be reproduction or animation of other characters, will be accurate. The experiments performed in the present work showed that the proposed technique produces basis elements that are visually recognizable as typical human expressions and can significantly reduce the reconstruction error. Even though the applicants did not demonstrated in the disclosure, the proposed technique can be effectively used for synthesizing expressions of other characters than the captured subject.

The proposed technique is an animator-in-the-loop method whose results are sensitive to the hand-generated expressions provided by the animator. If the animator provides inadequate expressions, the projection will not improve the result. The applicants have found that a musclebased approach to the modeling of the hand-generated expressions, as used in Section 5, effectively extends the coverage of the basis. Application of the proposed projection to hand-generated elements of this type reduces the reconstruction error. The muscle-based approach is not, however, the only way to obtain non-overlapping hand-generated expressions. A better guidance may be developed in the future, which can help the animator sculpt intuitively meaningful but non-overlapping faces.

Figure 5:
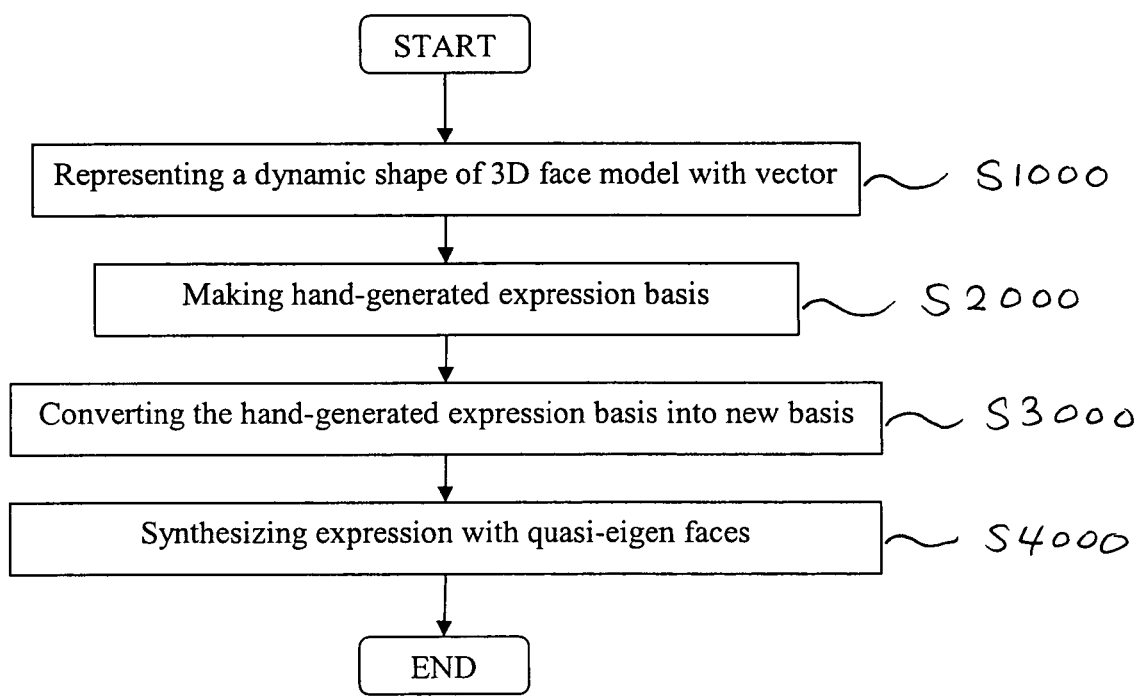
FIG. 5 is a flow chart showing a method according to the present invention.

According to the present invention, a method for generating intuitive quasi-eigen faces includes steps of: a) representing a dynamic shape of a three dimensional face model with a vector (S1000); b) making a hand-generated expression basis (S2000); c) converting the hand-generated expression basis into a new expression basis (S3000), wherein the new expression basis is a quasi-eigen faces; and d) synthesizing expression with the quasi-eigen faces (S4000) as shown in FIG. 5.

The new expression basis includes a plurality of quasi-eigen faces, wherein the linear combinations of the quasi-eigen faces cover a motion capture data, wherein each of the quasi-eigen faces resembles a corresponding element of the hand-generated expression basis.

The dynamic shape of a three dimensional face model is represented by a vector, $v=v(t)=[v_1^T, \ldots, v_N^T]^T$, where $v_i$ represents the 3D position of the i-th vertex, N is a number of vertices.

The vector v is represented by a triangular mesh including N vertices. The vector forms a facial mesh data.

The expression v is synthesized by $$v = v^0 + \sum_{i=1}^{n} w_i^H e_i^H,$$

where the neutral face, $v^0=[(v_1^0)^T, \ldots, (v_N^0)^T]^T$, and the weights, $w_i^H$, are given. The hand-generated expression basis is represented by $\hat{E}^H=\{\hat{e}_1^H, \ldots, \hat{e}_n^H\}$, where n is the number of elements of the hand-generated expression basis and $\hat{e}_i^H$ is the geometry of the i-th element.

The method set of displacement is represented by $$E^H=\{e_1^H, \ldots, e_N^H\},$$

where $e_i^H$ represents the displacement of $\hat{e}_i^H$ from the neutral face, $e_i^H=\hat{e}_i^H-v^0$.

Figure 6:
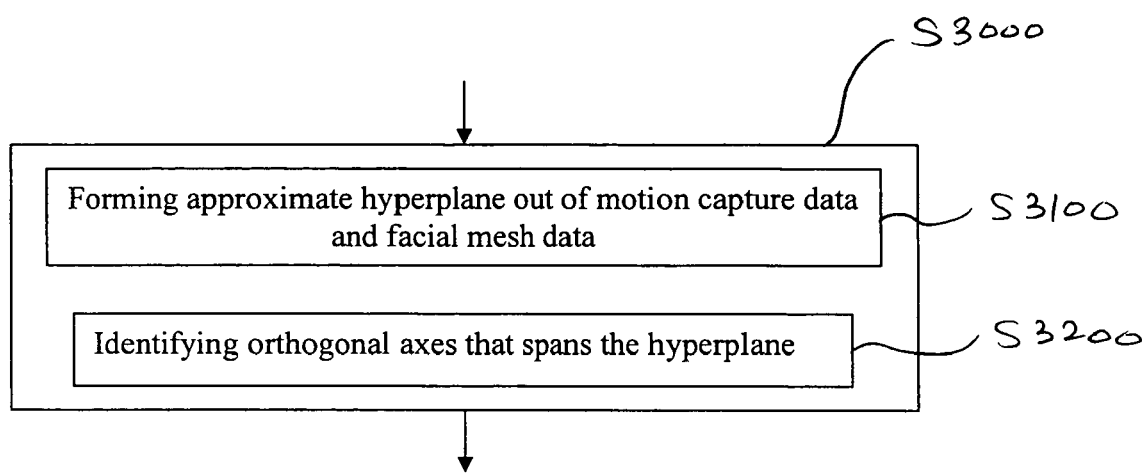
FIG. 6 is a flow chart showing a step of converting the hand-generated expression basis into a new expression basis.

The step (S3000) of converting the hand-generated expression basis into a new expression basis includes steps of: a) forming an approximate hyperplane out of the motion capture data or the facial mesh data(S3100); and b) identifying the orthogonal axes that spans the hyperplane (S3200) as shown in FIG. 6.

Figure 7:
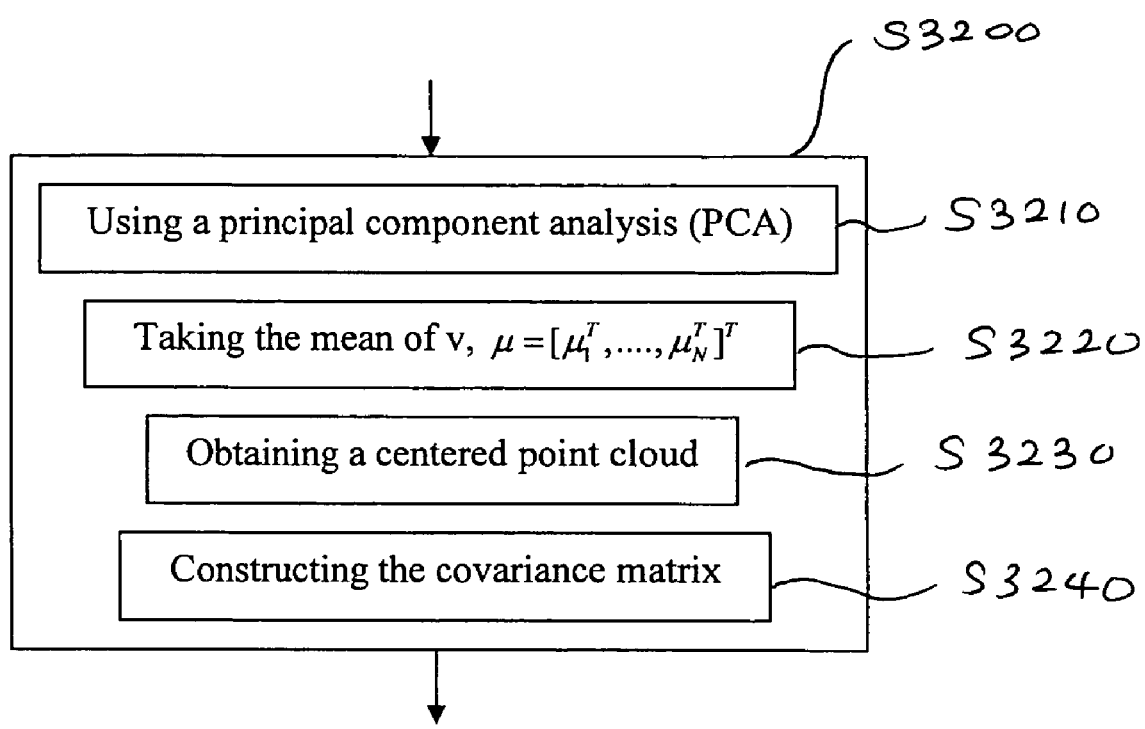
FIG. 7 is a flow chart showing a step of identifying orthogonal axes that spans the hyperplane.

The step (S3200) of identifying the orthogonal axes that spans a hyperplane includes a step (S3210) of using a principal component analysis (PCA) as shown in FIG. 7.

The motion capture data are given in given in a 3N×L matrix $\Xi=[v(1), \ldots, v(L)]$, where N is the number of vertices of mesh representing the motion capture data, where L is the duration of the motion capture in number of frames.

The hyperplane is formed by the cloud of points plotted $\Xi$ regarding each of the expressions in the 3N-dimensional space.

The step (S3200) of identifying the orthogonal axes that spans the hyperplane includes steps of: a) taking the mean of v, $\mu=[\mu_1^T, \ldots, \mu_N^T]^T$, where the summation is taken over the entire motion capture data $\Xi$ (S3220); b) obtaining a centered point cloud, $\tilde{D}=[\tilde{v}(1)^T, \ldots, \tilde{v}(L)^T]^T$, where $\tilde{v}(i)=v(i)-\mu$ (S3230); and c) constructing the covariance matrix C using $$C = \frac{1}{L}\tilde{D}\tilde{D}^T$$

(S3240) as shown in FIG. 7.

The C is a symmetric positive-definite matrix with positive eigenvalues $\lambda_1, \ldots, \lambda_{3N}$ in order of magnitude, with $\lambda_1$ being the largest.

Figure 8:
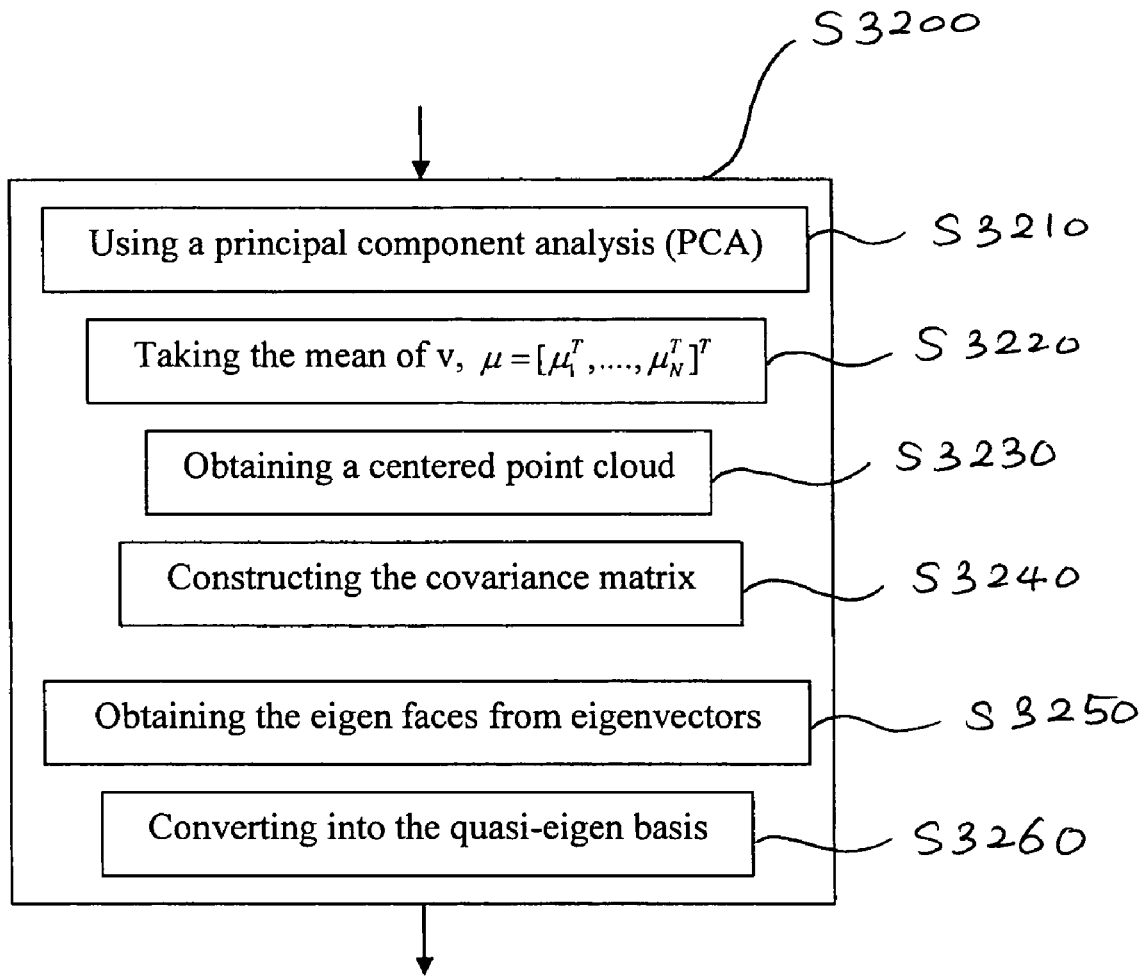
FIG. 8 is another flow chart showing a step of identifying orthogonal axes that spans the hyperplane in detail.

The method may further include a step (S3250) of obtaining the eigen faces from m eigenvectors $E^{PCA}=\{e_1^{PCA}, \ldots, e_m^{PCA}\}$ corresponding to $\{\lambda_1, \ldots, \lambda_m\}$, the principal axes as shown in FIG. 8.

The coverage of the principal axes is given by $$\sum_{i=1}^{m} \lambda_i \Big/ \sum_{i=1}^{3N} \lambda_i.$$

The method may further include a step (S3260) of converting the hand-generated expression basis into the quasi-eigen basis, the set of quasi-eigen faces, with the eigenfaces ready as shown in FIG. 8.

The step (S3260) of converting the hand-generated expression basis into the quasi-eigen basis includes steps of: a) computing $$w_{ij}^{PCA\text{-}to\text{-}QE} = e_j^{PCA} \cdot (e_i^H - \mu).$$

where i ranges over all the hand-generated elements, and j ranges over all the principal axes (S3261); and b) obtaining the quasi-eigen faces by $$e_i^{QE} = \mu + \sum_{j=1}^{m} w_{ij}^{PCA-to-QE} e_j^{PCA}$$

Figure 9:
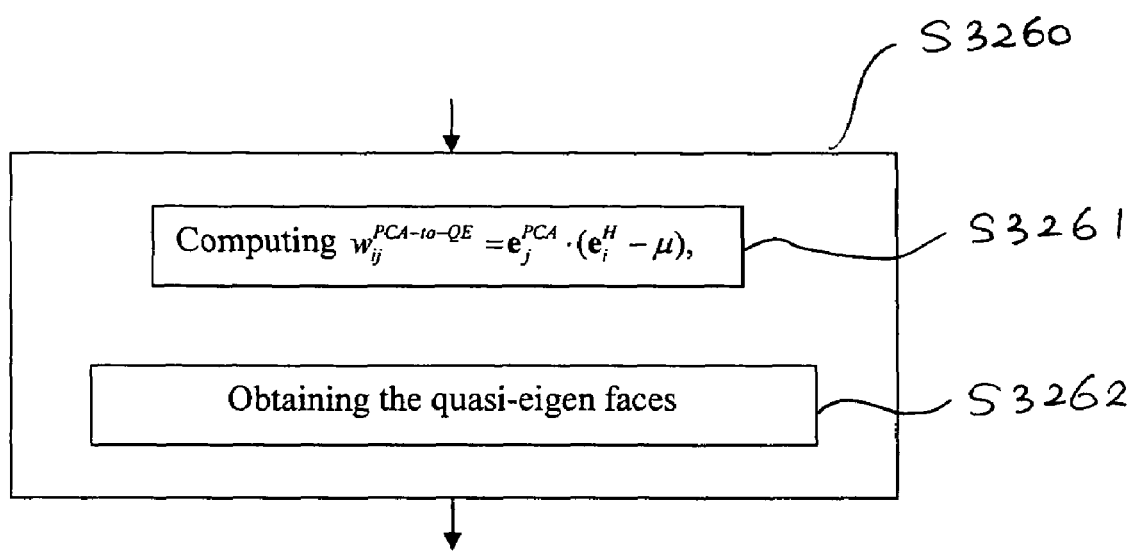
FIG. 9 is a flow chart showing a step of converting into the quasi-eigen basis.
Figure 10:
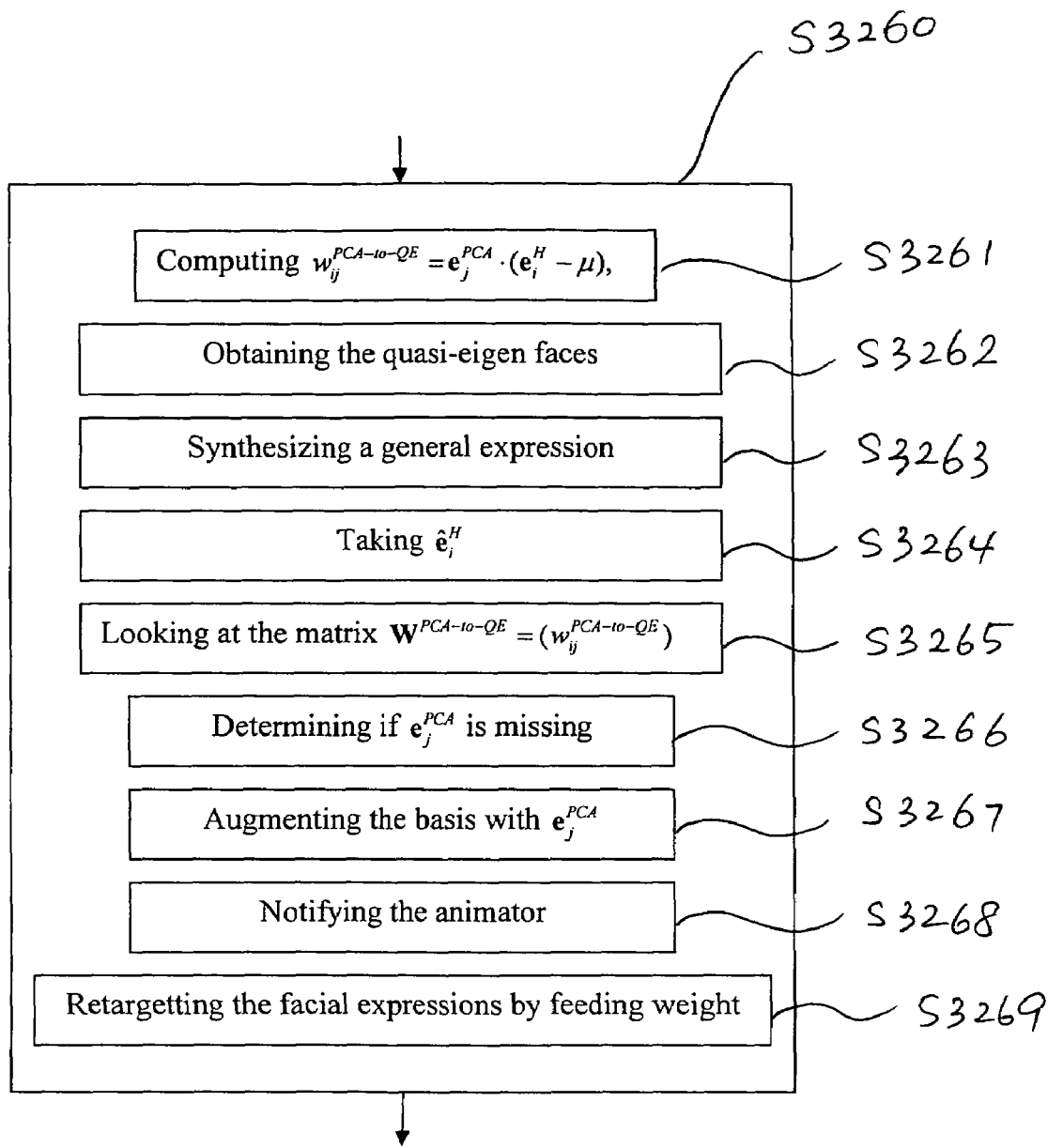
FIG. 10 is a flow chart showing a step of converting into the quasi-eigen basis in detail.

(S3262) as shown in FIG. 9 and FIG. 10.

The method may further include a step (S3263) of synthesizing a general expression by the linear combination $$\sum_{i=1}^{n} w_i^{QE} e_j^{PCA}.$$

The weights $w_i^{QE}$ takes on both positive and negative values when the eigenfaces are used.

The method may further include a step (S3264) of taking $\hat{e}_i^H$ to represent the full actuation of a single expression muscle with other muscles left relaxed for intrinsically ruling out the possibility of two hand-generated elements having almost identical shapes as shown in FIG. 10.

The method may further include steps of: a) looking at the matrix $W^{PCA\text{-}to\text{-}QE} = (w_{ij}^{PCA\text{-}to\text{-}QE})$ (S3265); b) determining if $e_j^{PCA}$ is missing in the quasi-eigen basis by testing if $$\sum_{i=1}^{n} \left| w_{ij}^{PCA-to-QE} \right|$$

is less than a threshold $\epsilon$ (S3266); c) augmenting the basis with $e_j^{PCA}$ (S3267); d) notifying the animator regarding the missing eigenface $e_j^{PCA}$ (S3268) as shown in FIG. 10.

The method may further include a step (S3269) of retargeting the facial expressions by feeding a predetermined expression weight vector to a deformation bases as shown in FIG. 10.

The predetermined expression weight vector is obtained by minimizing $$|v^* - v|^2 = \sum_{j=1}^{N} \left| d_j^* - \sum_{i=1}^{n} w_i^{QE} e_{ij}^{QE} \right|^2,$$

where $d_j^*$ and $e_{ij}^{QE}$ are the displacements of the j-th vertex of $v^*$ and $e_i^{QE}$, respectively, from $v^0$.

While the invention has been shown and described with reference to different embodiments thereof, it will be appreciated by those skilled in the art that variations in form, detail, compositions and operation may be made without departing from the spirit and scope of the invention as defined by the accompanying claims.

REFERENCES

BLANZ, V. AND VETTER, T. 1999. A morphable model for the synthesis of 3D faces. In *Proceedings of SIGGRAPH* 1999, ACM Press, 187-194.

BRAND, M. 1999. Voice puppetry. In *Proceedings of SIGGRAPH* 1999, ACM Press, 21-28.

BREGLER, C. 1997. Video Rewrite: driving visual speech with audio. In *Proceedings of SIGGRAPH* 1997, ACM Press, 353-360.

CHAI, J., XIAO, J. AND HODGINS, J. 2003. Vision-based control of 3D facial animation. In *Proceedings of ACM SIGGRAPH/Eurographics Symposium on Computer Animation.*, 193-206.

CHANG, Y.-J., AND EZZAT, T. 2005. Transferable Videorealistic Speech Animation. In *Proceedings of ACM SIGGRAPH/Eurographics Symposium on Computer Animation.*, 143-151.

CHAO, Y., FALOUTSOS, P. AND PIGHIN, F. 2003. Unsupervised learning for speech motion editing. In *Proceedings of ACM SIGGRAPH/Eurographics Symposium on Computer Animation.*, 225-231.

CHAO, Y., FALOUTSOS, P., KOHLER, E., AND PIGHIN, F. 2004. Real-time speech motion synthesis from recorded motions. In *Proceedings of ACM SIGGRAPH/Eurographics Symposium on Computer Animation.*, 347-355.

CHOE, B., LEE, H AND KO, H. -S. 2001. Performance-driven musclebased facial animation. In *Journal of Visualization and Computer Animation* 1999, 67-79.

CHOE, B. AND KO, H. -S. 2001. Analysis and synthesis of facial expressions with hand-generated muscle actuation basis. In *Proceedings of Computer Animation* 2001, 12-19.

CHUANG, E. 2002. *Performance driven facial animation using blendshape.* Stanford University Computer Science Technical Report, CS-TR-2002-02, 2002.

DENG, Z., LEWIS, J. P., AND NEUMANN, U. 2005. Synthesizing Speech Animation by Learning Compact Speech Co-Articulation Models. In *Proceedings of Computer graphics international.*, IEEE Computer Society Press, 19-25.

EKMAN, P. AND FRIESEN, W. V. 1978. Facial Action Coding System: A Technique for the Measurement of Facial Movement. Consulting Psychologists Press, Inc.

ESSA, I. AND PENTLAND, A. 1997. Coding, analysis, interpretation, and recognition of facial expressions. IEEE Transaction on Pattern Analysis and Machine Intelligence Vol. 19, No. 7, 757-763.

EZZAT, T., GEIGER, G., AND POGGIO, T. 2002. Trainable videorealistic speech animation. In *Proceedings of SIGGRAPH* 2002, ACM Press, 388-398.

FAIGIN G. 1990. The Artists Complete Guide to Facial Expression. Watson-Guptill Publications GUENTER, B., GRIMM, C., WOOD, D. MALVAR, H. AND PIGHIN, F. 1998. Making faces. In *Proceedings of SIGGRAPH* 1998, ACM Press, 55-66.

JOSHI, P., TIEN, W., C., DESBRUN, M., AND PIGHIN, F. 2003. Learning controls for blend shape based realistic facial animation. In *Proceedings of ACM SIGGRAPH/Eurographics Symposium on Computer Animation.*

KAHLER, K., HABER, J., AND SEIDEL, H. -P. 2001. Geometrybased muscle modeling for facial animation. In *Proceedings of Graphics Interface* 2001, 37-46.

KOUADIO, C., POULIN, P., AND LACHAPELLE, P. 1998. Realtime facial animation based upon a bank of 3D facial expression. In *Proceedings of Computer Animation* 1998, IEEE Computer Society Press.

LEE, Y., TERZOPOULOS, D., AND WATERS, K. 1995. Realistic modeling for facial animation. In *Proceedings of SIGGRAPH* 1995, ACM Press, 55-62.

NA, K. AND JUNG, M. 2004. Hierarchical retargetting of fine facial motions. In *Proceedings of Eurographics* 2004, Vol. 23.

NOH, J. AND NEUMANN, U. 2001. Expression cloning In *Proceedings of SIGGRAPH* 2001, ACM Press, 277-288.

PARKE, F. I. 1972. Synthesizing realistic facial expressions from photographs. In *Proceedings of ACM Conference* 1972, ACM Press, 451-457.

PIGHIN, F., HECKER, J., LISCHINSKI, D., SZELISKI, R., AND SALESIN, D. H. 1998. Synthesizing realistic facial expressions from photographs. In *Proceedings of SIGGRAPH* 1998, ACM Press, 75-84.

PIGHIN, F., SZELISKI, R., AND SALESIN, D. H. 1999. Resynthesizing facial animation through 3D model-based tracking. In *Proceedings of International Conference on Computer Vision* 1999, 143-150.

PYUN, H., KIM, Y., CHAE, W., KANG, H. W., AND SHIN, S. Y. 2003. An example-based approach for facial expression cloning. In *Proceedings of ACM SIGGRAPH/Eurographics Symposium on Computer Animation.*, 167-176.

SIFAKIS, E., NEVEROV, I., AND FEDKIW, R. 2005. Automatic determination of facial muscle activations from sparse motion capture marker data. In *Proceedings of SIGGRAPH* 2005, ACM Press, 417-425.

TERZOPOULOS, D., AND WATERS, K. 1990. Physically-based facial modeling, analysis and animation. *The Journal of Visualization and Computer Animation,* 73-80.

TERZOPOULOS, D., AND WATERS, K. 1993. Analysis and synthesis of facial image sequences using physical and anatomical models. *IEEE Transactions on Pattern Analysis and Machine Intelligence,* Vol. 15, No. 6, 569-579.

VLASIC, D., BRAND, M., PFISTER, H., AND POPOVIC, J. 2005. Face transfer with multilinear models. In *Proceedings of SIGGRAPH* 2005, ACM Press, 426-433.

WANG, Y., HUANG, X., LEE, C. S., ZHANG, S., LI, Z., SAMARAS, D., METAXAS, D., ELGAMMAL, A., AND HUANG, P. 2004. High resolution acquisition, learning and transfer of dynamic 3-D facial expressions. In *Proceedings of Eurographics* 2004, 677-686

WATERS, K. 1987. A muscle model for animating three-dimensional facial expressions. In *Proceedings of SIGGRAPH* 1987, ACM Press, 17-24.

WILLIAMS, L. 1990. Performance-driven facial animation. In *Proceedings of SIGGRAPH* 1990, ACM Press, 235-242.

WU, Y., THALMANN, N. M., AND THALMANN, D. 1995. A dynamic wrinkle model in facial animation and skin ageing. *Journal of Visualization and Computer Animation* 1995, 195-206.

ZHANG, L., SNAVELY, N., CURLESS, B., AND SEITZ, S. 2004. Spacetime faces: High resolution capture for modeling and animation. In *Proceedings of SIGGRAPH* 2004, ACM Press, 548-558.

What is claimed is:

1. A method for generating intuitive quasi-eigen faces comprising steps of:

a) representing a dynamic shape of a three dimensional face model with a vector;

b) making a hand-generated expression basis;

c) converting the hand-generated expression basis into a new expression basis, wherein the new expression basis is a quasi-eigen faces generated using a computer; and d) synthesizing expression with the quasi-eigen faces using a computer, wherein the new expression basis comprises a plurality of quasi-eigen faces, wherein the linear combinations of the quasi-eigen faces cover a motion capture data, wherein each of the quasi-eigen faces resembles a corresponding element of the hand-generated expression basis, wherein the dynamic shape of a three dimensional face model is represented by a vector, $v=v(t)=[v_1^T, \ldots, v_N^T]^T$, wherein superscript T represents a transpose of a vector, and wherein $v_i$ represents the 3D position of the i-th vertex, N is a number of vertices, wherein the vector v is represented by a triangular mesh comprising N vertices, wherein the vector forms a facial mesh data, wherein the expression v is synthesized by $$v = v^0 + \sum_{i=1}^{n} w_i^H e_i^H,$$

wherein the neutral face, $v^0=[(v_1^0)^T, \ldots, (v_N^0)^T]^T$, and the weights, $w_i^H$, are given, wherein the hand-generated expression basis is given by $\hat{E}^H=\{\hat{e}_1^H, \ldots, \hat{e}_n^H\}$, wherein n is the number of elements of the hand-generated expression basis and $\hat{e}_i^H$ is the geometry of the i-th element, and wherein superscript H stands for hand-generated and $e_i^H$ represents a displacement of $\hat{e}_i^H$ from a neutral face, and wherein the step of converting the hand-generated expression basis into a new expression basis comprises steps of:

a) forming an approximate hyperplane out of the motion capture data or the facial mesh data; and b) identifying the orthogonal axes that spans the hyperplane.

2. The method of claim 1, wherein the hand-generated expression n space bases are represented by $\hat{E}^H=\{\hat{e}_1^H, \ldots, \hat{e}_n^H\}$, wherein n is the number of elements of the hand-generated expression basis and $\hat{e}_i^H$ is the geometry of the i-th element, a hand-generated face model.

3. The method of claim 2, wherein the set of displacement of the hand-generated express basis is represented by $$E^H=\{e_1^H, \ldots, e_N^H\},$$

wherein $e_i^H$ represents the displacement of $\hat{e}_i^H$ from the neutral face, $e_i^H=\hat{e}_i^H-v^0$.

4. The method of claim 1, wherein the step of identifying the orthogonal axes that spans a hyperplane comprises a step of using a principal component analysis (PCA).

5. The method of claim 4, wherein the motion capture data are given in given in a 3N×L (3N rows and L columns) matrix $\Xi=[v(1), \ldots, v(L)]$, an entire motion capture data, where N is the number of vertices of mesh representing the motion capture data, wherein L is the duration of the motion capture in number of frames.

6. The method of claim 5, wherein the hyperplane is formed by the cloud of points plotted $\Xi$ regarding each of the expressions in the 3N-dimensional space.

7. The method of claim 5, wherein the step of identifying the orthogonal axes that spans the hyperplane comprises steps of:
 a) taking the mean of v, $\mu=[\mu_1^T, \ldots, \mu_N^T]^T$, where the summation is taken over the entire motion capture data $\Xi$, and where $\mu$ is a mean of the entire motion capture data $\Xi$;
 b) obtaining a centered point cloud, $\tilde{D}=[\tilde{v}(1)^T, \ldots, \tilde{v}(L)^T]^T$, where $\tilde{v}(i)=v(i)-\mu$, which is a displacement of v from the mean $\mu$, and $\tilde{D}$ is a set of displacements for L frames; and
 c) constructing the covariance matrix C using $$C = \frac{1}{L}\tilde{D}\tilde{D}^T.$$

8. The method of claim 7, wherein C is a symmetric positive-definite matrix with positive eigenvalues $\lambda_1, \ldots, \lambda_{3N}$ in order of magnitude, with $\lambda_1$ being the largest, where 3N represents three times the number of vertices.

9. The method of claim 8, further comprising a step of obtaining the eigen faces from m eigenvectors $E^{PCA}=\{e_1^{PCA}, \ldots, e_m^{PCA}\}$ corresponding to $\{\lambda_1, \ldots, \lambda_m\}$, the principal axes, where $E^{PCA}$ represents an expression basis obtained by the PCA.

10. The method of claim 9, wherein the coverage of the principal axes is given by $$\sum_{i=1}^{m} \lambda_i / \sum_{i=1}^{3N} \lambda_i.$$

where 3N represents three times the number of vertices.

11. The method of claim 9, further comprising a step of converting the hand-generated expression basis into the quasi-eigen basis, the set of quasi-eigen faces, with the eigenfaces ready.

12. The method of claim 11, wherein the step of converting the hand-generated expression basis into the quasi-eigen basis comprises steps of:
 a) computing weights, for a projection of the hand-generated element onto each principal axis,
  $w_{ij}^{PCA\text{-}to\text{-}QE}=e_j^{PCA}\cdot(e_i^H-\mu),$
  where i ranges over all the hand-generated elements, and j ranges over all the principal axes for spanning the hand-generated elements, and QE represents the quasi-eigen basis; and b) obtaining the quasi-eigen faces by $$e_i^{QE} = \mu + \sum_{j=1}^{m} \left| w_{ij}^{P\dot{C}A\text{-}to\text{-}QE} e_j^{PCA} \right|.$$

13. The method of claim 12, further comprising a step of synthesizing a general expression by the linear combination $$\sum_{i=1}^{n} w_i^{QE} e_j^{PCA}.$$

14. The method of claim 13, wherein the weights $w_i^{QE}$ takes on both positive and negative values when the eigenfaces are used.

15. The method of claim 12, further comprising a step of taking $\hat{e}_i^H$ to represent the full actuation of a single expression muscle with other muscles left relaxed for intrinsically ruling out the possibility of two hand-generated elements having almost identical shapes.

16. The method of claim 12, further comprising steps of:
 a) looking at the matrix $W^{PCA\text{-}to\text{-}QE}=(w_{ij}^{PCA\text{-}to\text{-}QE})$;
 b) determining if $e_j^{PCA}$ is missing in the quasi-eigen basis by testing if $$\sum_{i=1}^{n} \left| w_{ij}^{P\dot{C}A\text{-}to\text{-}QE} \right|$$

is less than a threshold $\epsilon$;
 c) augmenting the basis with $e_j^{PCA}$;
 d) notifying the animator regarding the missing eigenface $e_j^{PCA}$.

17. The method of claim 12, further comprising a step of retargeting the facial expressions by feeding a predetermined expression weight vector to a deformation bases.

18. The method of claim 17, wherein the predetermined expression weight vector is obtained by minimizing $$|v^* - v|^2 = \sum_{j=1}^{N} \left| d_j^* - \sum_{i=1}^{n} w_i^{QE} e_{ij}^{QE} \right|^2,$$

where $d_j^*$ and $e_{ij}^{QE}$ are the displacements of the j-th vertex of $v^*$ and $e_i^{QE}$, respectively, from $v^0$, where $v^*=v^0+d^*$ and $d^*$ is a 3N-dimensional displacement vector from the neutral expression, and $$v = v^0 + \sum_{i=1}^{n} w_i^{QE} e_i^{QE}$$

is a reconstruction of a frame.

* * * * *